(12) United States Patent
Gao et al.

(10) Patent No.: US 11,958,759 B2
(45) Date of Patent: Apr. 16, 2024

(54) TERNARY OXIDE BASED COMPOSITE CATHODE MATERIAL FOR LITHIUM-SULFUR BATTERY AND PREPARATION METHOD THEREOF

(71) Applicant: NANKAI UNIVERSITY, Tianjin (CN)

(72) Inventors: Xueping Gao, Tianjin (CN); Lu Wang, Tianjin (CN); Guoran Li, Tianjin (CN); Sheng Liu, Tianjin (CN)

(73) Assignee: NANKAI UNIVERSITY, Tianjin (CN)

( * ) Notice: Subject to any disclaimer, the term of this patent is extended or adjusted under 35 U.S.C. 154(b) by 583 days.

(21) Appl. No.: 17/264,294

(22) PCT Filed: Jan. 19, 2019

(86) PCT No.: PCT/CN2019/072446
§ 371 (c)(1),
(2) Date: Jan. 28, 2021

(87) PCT Pub. No.: WO2020/037948
PCT Pub. Date: Feb. 27, 2020

(65) Prior Publication Data
US 2021/0300781 A1    Sep. 30, 2021

(30) Foreign Application Priority Data
Aug. 21, 2018  (CN) .......................... 201810954803.9

(51) Int. Cl.
*H01M 10/36* (2010.01)
*C01G 53/00* (2006.01)

(52) U.S. Cl.
CPC ............ *C01G 53/50* (2013.01); *H01M 10/36* (2013.01); *C01P 2004/32* (2013.01); *C01P 2004/61* (2013.01); *C01P 2006/11* (2013.01)

(58) Field of Classification Search
None
See application file for complete search history.

(56) References Cited

FOREIGN PATENT DOCUMENTS

CN          105529446         4/2016

OTHER PUBLICATIONS

Machine Translation of CN105529446 (Year: 2016).*
Wang L, Song YH. Zhang BH, Liu YT, Wang ZY, Li GR, Liu S, Gao XP. Spherical Metal Oxides with High Tap Density as Sulfur Host to Enhance Cathode Volumetric Capacity for Lithium-Sulfur Battery. ACS Appl Mater Interfaces. Feb. 5, 2020;12(5):5909-5919. doi: 10.1021/acsami.9b20111. Epub Jan. 27, 2020. PMID: 31944646.

* cited by examiner

*Primary Examiner* — Wyatt P McConnell

(57) ABSTRACT

A ternary oxide based composite cathode material for a lithium-sulfur battery and a preparation method thereof are provided wherein the composite cathode material includes: sulfur and $LiNi_{0.8}Co_{0.15}Al_{0.05}O_2$ or $LiNi_xCo_yMn_{1-x-y}O_2$ ($0<x<1$, $0<y<1$, $0<x+y<1$), wherein a sulfur content is 50 wt. %-80 wt. %. The host has adsorption and catalytic effects on polar polysulfides, which can fix sulfur and promote electrochemical reactions, thereby preparing lithium-sulfur battery with high capacity and high stability.

1 Claim, 3 Drawing Sheets

TERNARY OXIDE BASED COMPOSITE CATHODE MATERIAL FOR LITHIUM-SULFUR BATTERY AND PREPARATION METHOD THEREOF

BACKGROUND OF THE PRESENT INVENTION

Field of Invention

The present invention relates to a technical field of electrode materials for lithium-sulfur batteries, and more particularly to a composite cathode material for lithium-sulfur battery based on nickel-cobalt-aluminum or nickel-cobalt-manganese ternary materials and a preparation method thereof.

Description of Related Arts

In recent years, more and more new energy vehicles are entering people's lives. The development of new energy vehicles can help optimize the energy structure and solve the environmental problems caused by traditional fuels. However, the development of new energy vehicles relies on the reliable power storage system with high safety. As an efficient and clean energy storage system commonly used in new energy vehicles, electrochemical batteries not only need to have high safety, but also need to have high energy density. Although the current development momentum of electric vehicles is high, the proportion is still less than 1%. One of the factors is the energy density of the battery. It is reported that the extreme value of the energy density of electric vehicles equipped with lithium-ion batteries is only about 1/40 of that of fuel vehicles. At the same time, low volumetric energy density of the battery pack will cause the battery pack to be too large and occupy a larger space in the car, which will adversely affect the design and driving experience of new energy vehicles. Conventionally, the energy density of commercial lithium-ion batteries can reach 200-250 Wh $kg^{-1}$, but it is still difficult to meet the booming needs of the industry. Therefore, in order to accelerate the development of new energy vehicles, it is urgent to optimize the conventional energy structure, and develop a new high-energy density battery system.

There are two common methods to increase the energy density of the battery. One is to reduce the parts that do not contribute to the capacity, such as current collectors and binders. The second method is to increase the capacity per unit mass or unit volume of the cathode and anode active materials. The first method has limited effect on increasing the energy density of the battery. Therefore, the cathode and anode active materials have become the key to increasing the energy density of the battery. In commercial lithium-ion batteries, the cathode materials with large molecular weight and small number of transferred electrons make little room for the improvement on energy density. Developing light-weight active materials with multi-electron reactions has become an effective way to increase the energy density of batteries (Energy & Environmental Science, 2010, 3, 174-189). Lithium-sulfur batteries, based on the two electrons reaction between the light-weight sulfur and lithium could offer a high gravimetric energy density of 2600 Wh $kg^{-1}$. And it has been regarded as one of the most promising high specific energy secondary battery systems in the future. However, the inherent insulation of sulfur and the "shuttle effect" of soluble intermediates reduce the utilization of active materials and shorten the cycle life. The elemental sulfur is usually combined with other conductive carbon materials to construct a sulfur/carbon composite cathode material to improve the conductivity of the active material, and the developed pore structure and large specific surface area of the carbon material are used to physically adsorb lithium polysulfides, thereby improving the cycle performance of the sulfur cathode to a certain extent. However, such physical adsorption cannot ensure the long-term cycle stability of the battery. At the same time, the density of carbon materials is small and the specific surface area is large, which is not conducive to the improvement of the volumetric energy density of cathode materials. Although sulfur loading of the conventional carbon based high-sulfur-loaded cathodes can be up to 10 mg $cm^{-2}$, (Advanced Materials, 2016, 28, 3374-3382), such material usually has a self-supporting structure made of carbon materials, such as graphene and carbon nanotubes. As a result, electrode sheets cannot be rolled, and gaps between the electrode sheets will increase the using of electrolyte. In addition, the dissolution and shuttle problems of lithium polysulfides still exist.

SUMMARY OF THE PRESENT INVENTION

An object of the present invention is to provide a ternary oxide based composite cathode material for lithium-sulfur battery, wherein polar adsorption and catalytic conversion of the ternary oxide on polar lithium polysulfides can slow down the diffusion and shuttle of lithium polysulfides and improve the electrochemical stability of lithium-sulfur batteries.

Accordingly, in order to accomplish the above objects, the present invention provides a ternary oxide based composite cathode material for a lithium-sulfur battery, comprising: sulfur and $LiNi_{0.8}Co_{0.15}Al_{0.05}O_2$ or $LiNi_xCo_yMn_{1-x-y}O_2$ (0<x<1, 0<y<1, 0<x+y<1) as a host, wherein a sulfur content is 50 wt. %-80 wt. %.

Preferably, the $LiNi_{0.8}Co_{0.15}Al_{0.05}O_2$ has a layered structure, which is a spherical secondary particle formed by accumulating flake primary particles; a particle diameter of the $LiNi_{0.8}Co_{0.15}Al_{0.05}O_2$ is 2-25 μm, and a tap density is 2.0-2.6 g $cm^{-3}$.

Preferably, the $LiNi_xCo_yMn_{1-x-y}O_2$ has a layered structure, which is a secondary particle formed by accumulating primary particles; the secondary particles are spherical with a diameter of 2-25 μm; the $LiNi_xCo_yMn_{1-x-y}O_2$ is $LiNi_{1/3}Co_{1/3}Mn_{1/3}O_2$, $LiNi_{0.8}Co_{0.2}Mn_{0.3}O_2$, $LiNi_{0.6}Co_{0.2}Mn_{0.2}O_2$ or $LiNi_{0.8}Co_{0.1}Mn_{0.1}O_2$, and specific surface areas thereof are 46.72, 10.90, 12.73 and 10.40 $m^2$ $g^{-1}$, while tap densities are 2.09, 2.48, 2.46 and 2.56 g $cm^{-3}$.

The present invention also provides a method for preparing a ternary oxide based composite cathode material for a lithium-sulfur battery, comprising: compositing sulfur and the host by a simple mixing method, a melting method, a vapor deposition method, a dissolution-crystallization method, or a chemical deposition method.

Preferably, the simple mixing method comprises steps of: mixing sulfur and $LiNi_{0.8}Co_{0.15}Al_{0.05}O_2$ or $LiNi_xCo_yMn_{1-x-y}O_2$ (0<x<1, 0<y<1, 0<x+y<1) in proportion and then grinding to obtain the ternary oxide based composite cathode material.

Preferably, the melting method comprises steps of: mixing sulfur and $LiNi_{0.8}Co_{0.15}Al_{0.05}O_2$ or $LiNi_xCo_yMn_{1-x-y}O_2$ (0<x<1, 0<y<1, 0<x+y<1) in proportion and grinding, then placing a mixture obtained in a reaction kettle filled with a gas selected from the group consisting of nitrogen, argon, helium and carbon dioxide; heating the reaction kettle at 100-200° C. for 2-20 h and cooling to a room temperature to obtain the ternary oxide based composite cathode material.

Preferably, the vapor deposition method comprises steps of: mixing sulfur and LiNi$_{0.8}$Co$_{0.15}$Al$_{0.05}$O$_2$ or LiNi$_x$Co$_y$Mn$_{1-x-y}$O$_2$ ($0<x<1$, $0<y<1$, $0<x+y<1$) in proportion and grinding, then placing a mixture obtained in a reaction kettle filled with a gas selected from the group consisting of nitrogen, argon, helium and carbon dioxide; heating the reaction kettle at 100-200° C. for 2-20 h, and then heating at 250-350° C. for 2-12 h and cooling to a room temperature to obtain the ternary oxide based composite cathode material.

Preferably, the dissolution-crystallization method comprises steps of: dissolving sulfur in a solvent, wherein a concentration range of the sulfur in a solution obtained is 1-20 mg mL$^{-1}$; then adding LiNi$_{0.8}$Co$_{0.15}$Al$_{0.05}$O$_2$ or LiNi$_x$Co$_y$Mn$_{1-x-y}$O$_2$ ($0<x<1$, $0<y<1$, $0<x+y<1$) into the solution in proportion, and stirring to evaporate the solvent; drying and cooling a solid obtained to obtain the ternary oxide based composite cathode material; wherein the solvent is selected from the group consisting of carbon disulfide, carbon tetrachloride, benzene, toluene, o-xylene, m-xylene, p-xylene, cyclohexane, octane, tetrachloroethylene, trichlorethylene and tetrachloroethane.

Preferably, the chemical deposition method comprises steps of: fully mixing LiNi$_{0.8}$Co$_{0.15}$Al$_{0.05}$O$_2$ or LiNi$_x$Co$_y$Mn$_{1-x-y}$O$_2$ ($0<x<1$, $0<y<1$, $0<x+y<1$) with a sulfide solution, and adding an acid solution drop by drop to obtain sulfur by reaction of the sulfide solution and the acid solution; centrifuging and drying to obtain the ternary oxide based composite cathode material; wherein the sulfide solution is sodium thiosulfate or sodium polysulfide solution with a concentration of 0.01-1 mol L$^{-1}$; the acid solution is selected from the group consisting of sulfuric acid, hydrochloric acid, nitric acid, phosphoric acid, acetic acid and formic acid with a concentration is 0.1-10 mol L$^{-1}$; a reaction time is 0.5-6 h.

The present invention also provides a lithium-sulfur battery, comprising a cathode plate made of the ternary oxide based composite cathode material as mentioned above.

The present invention uses LiNi$_{0.8}$Co$_{0.15}$Al$_{0.05}$O$_2$ or LiNi$_x$Co$_y$Mn$_{1-x-y}$O$_2$ ($0<x<1$, $0<y<1$, $0<x+y<1$) as a host which is combined with sulfur to obtain the composite cathode material for the lithium-sulfur battery. The host has adsorption and catalytic effects on polar polysulfides, which can fix sulfur and promote electrochemical reactions, thereby preparing lithium-sulfur battery with high capacity and high stability.

LiNi$_{0.8}$Co$_{0.15}$Al$_{0.05}$O$_2$ and LiNi$_x$Co$_y$Mn$_{1-x-y}$O$_2$ ($0<x<1$, $0<y<1$, $0<x+y<1$) are both commercialized lithium-ion cathode materials with mature preparation processes, readily available raw materials, and high tap density. Compared with sulfur/carbon composite cathode materials, they are more conducive to increasing the volumetric energy density of cathode material.

DETAILED DESCRIPTION OF THE PREFERRED EMBODIMENT

Figure 1:
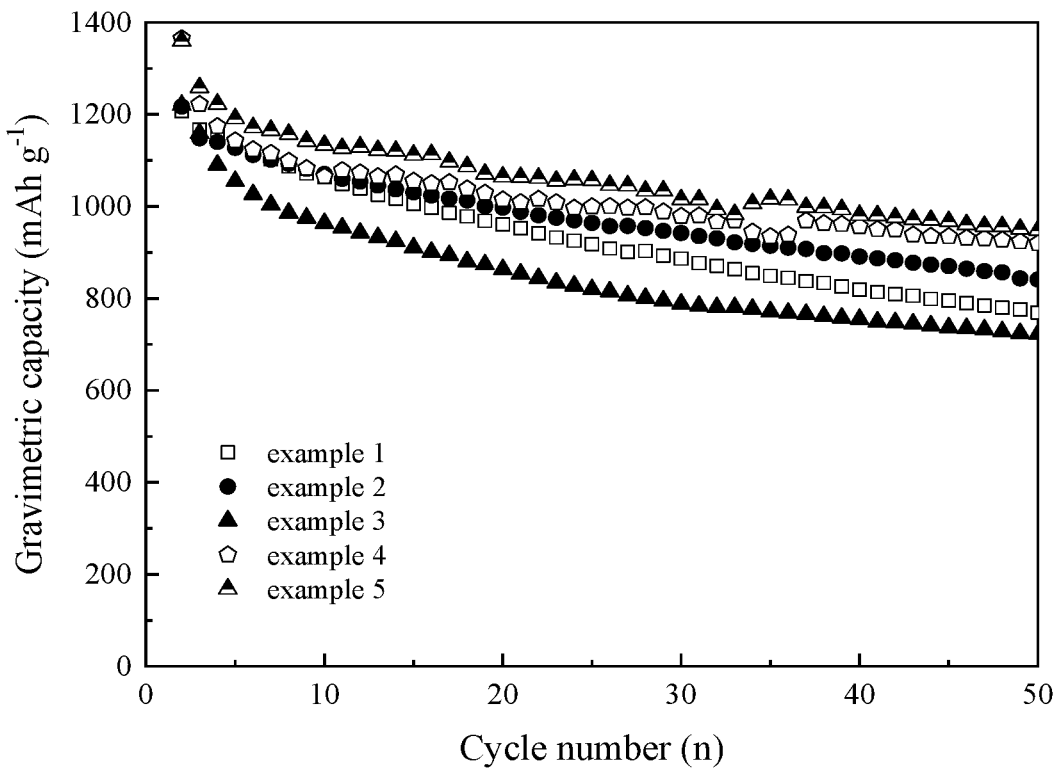
FIG. 1 is a graph showing cycle performance of composite cathode materials according to examples 1-5 at 0.1C.

Generally, the present invention provides a ternary oxide based composite cathode material for a lithium-sulfur battery, comprising: sulfur and LiNi$_{0.8}$Co$_{0.15}$Al$_{0.05}$O$_2$ or LiNi$_x$Co$_y$Mn$_{1-x-y}$O$_2$ ($0<x<1$, $0<y<1$, $0<x+y<1$) as a host, wherein a sulfur content is 50 wt. %-80 wt. %, such as 50%, 55%, 60%, 65%, 70%, 75% and 80%.

Accordingly, the host material is a nickel-cobalt-aluminum ternary material or a nickel-cobalt-manganese ternary material, which is a commercialized lithium-ion battery cathode material. The host material is combined with the sulfur as the cathode material of the lithium-sulfur battery. The raw materials are readily available and the method is simple.

As the sulfur host material in the cathode material of the lithium-sulfur battery, the nickel-cobalt-aluminum ternary material can provide strong adsorption and catalysis to lithium polysulfides, so as to effectively inhibit the dissolution of lithium polysulfide, alleviate the shuttle effect, and provide high specific capacity and high cycle stability to the battery.

As the sulfur host material in the cathode material of the lithium-sulfur battery, the nickel-cobalt-manganese ternary material can provide strong chemical adsorption effect on polar lithium polysulfides. At the same time, the nickel-cobalt-manganese ternary material has a catalytic conversion effect on lithium polysulfides. It can reduce lithium polysulfides to thiosulfate, promote the conversion of lithium polysulfides, inhibit the dissolution of lithium polysulfides, and slow down the "shuttle effect", thereby obtaining a lithium-sulfur battery with high capacity and high stability.

The sulfur is one or both of precipitated sulfur and sublimated sulfur, and a mesh number of sulfur powder is 100-325 meshes.

In a preferred embodiment, the nickel-cobalt-aluminum ternary material is a commercialized lithium-ion battery material Li(Ni$_{0.8}$Co$_{0.15}$Al$_{0.05}$)O$_2$, and a corresponding precursor is prepared by a co-precipitation method. The process is mature and can prepare on a large scale.

The Li(Ni$_{0.8}$Co$_{0.15}$Al$_{0.05}$)O$_2$ ternary material has a layered structure, which is a spherical secondary particle formed by accumulating primary particles, and sphericity is sufficient. A particle diameter is 2-25 μm, and a specific surface area is small. After being combined with the sulfur, it is convenient to prepare cathode plates in industry by smearing. At the same time, it can significantly reduce the using of electrolyte, increase the energy density of the battery, reduce the manufacturing cost, and improve the energy density of the battery.

A tap density of the Li(Ni$_{0.8}$Co$_{0.15}$Al$_{0.05}$)O$_2$ ternary material is relatively high, and measured values are 2.0-2.6 g cm$^{-3}$. A tap density of an S/Li(Ni$_{0.8}$Co$_{0.15}$Al$_{0.05}$)O$_2$ composite material obtained by mixing the Li(Ni$_{0.8}$Co$_{0.15}$Al$_{0.05}$)O$_2$ ternary material and the sulfur in proportion of 30:70 (mass ratio) is 1.5-2.0 g cm$^{-3}$. For comparison, a tap density of a sulfur/bp2000 composite cathode material obtained by mixing conventional commercial conductive carbon bp2000 and sulfur in proportion of 30:70 is 0.83 g cm$^{-3}$. The tap density of the S/Li(Ni$_{0.8}$Co$_{0.15}$Al$_{0.05}$)O$_2$ composite material of the present invention is higher than that of the S/bp2000 composite cathode material. Using the nickel-cobalt-aluminum ternary material as the lithium-sulfur battery cathode host material can increase the tap density of the cathode material, thereby increasing the volumetric energy density of the lithium-sulfur battery.

In a preferred embodiment, the LiNi$_x$Co$_y$Mn$_{1-x-y}$O$_2$ ($0<x<1$, $0<y<1$, $0<x+y<1$) ternary material has a layered structure, which is a secondary particle formed by accumulating primary particles; the secondary particles are spherical with a diameter of 2-25 μm; the nickel-cobalt-manganese ternary material is LiNi$_{1/3}$Co$_{1/3}$Mn$_{1/3}$O$_2$, LiNi$_{0.8}$Co$_{0.2}$Mn$_{0.3}$O$_2$, LiNi$_{0.6}$Co$_{0.2}$Mn$_{0.2}$O$_2$ or LiNi$_{0.8}$Co$_{0.1}$Mn$_{0.1}$O$_2$, and specific surface areas thereof are 46.72, 10.90, 12.73 and 10.40 m$^2$ g$^{-1}$, while tap densities are 2.09, 2.48, 2.46 and 2.56 g cm$^{-3}$.

The nickel-cobalt-manganese ternary material is a solid sphere formed by accumulating of the primary particles, which has a small specific surface area. Compared with nanomaterials and porous materials, it uses less electrolyte and increases the energy density of the battery.

The tap densities of S/LiNi$_{1/3}$Co$_{1/3}$Mn$_{1/3}$O$_2$, S/LiNi$_{0.8}$Co$_{0.2}$Mn$_{0.3}$O$_2$, S/LiNi$_{0.6}$Co$_{0.2}$Mn$_{0.2}$O$_2$ and S/LiNi$_{0.8}$Co$_{0.1}$Mn$_{0.1}$O$_2$ composite material obtained by mixing the nickel-cobalt-manganese ternary material and the sulfur are 1.68, 1.77, 1.77, and 1.81 g cm$^{-3}$. The above-mentioned composite materials have high tap densities, which are beneficial to obtain high volumetric energy density cathode materials.

The above-mentioned ternary materials can be composited with the sulfur by different preparation methods to obtain the composite cathode material for the lithium-sulfur battery with a high sulfur content. Generally, the present invention also provides a method for preparing a ternary oxide based composite cathode material for the lithium-sulfur battery, comprising: compositing sulfur and the host by a simple mixing method, a melting method, a vapor deposition method, a dissolution-crystallization method, or a chemical deposition method.

In a detailed embodiment, the simple mixing method comprises steps of: mixing sulfur and LiNi$_{0.8}$Co$_{0.15}$Al$_{0.05}$O$_2$ or LiNi$_x$Co$_y$Mn$_{1-x-y}$O$_2$ ($0<x<1$, $0<y<1$, $0<x+y<1$) in proportion and then grinding to obtain the ternary oxide based composite cathode material.

For example, the simple mixing method can adopt one or both of grinding and ball milling, wherein a grinding time is 15-60 min; a ball milling time is 15-120 min, and a ball milling speed is 50-600 rpm. A ball-to-material ratio is 1:1-50:1, and a solvent used for ball milling is selected from the group consisting of water, methanol, ethanol, isopropanol, and butanol.

In a detailed embodiment, the melting method comprises steps of: mixing sulfur and LiNi$_{0.8}$Co$_{0.15}$Al$_{0.05}$O$_2$ or LiNi$_x$Co$_y$Mn$_{1-x-y}$O$_2$ ($0<x<1$, $0<y<1$, $0<x+y<1$) in proportion and grinding, then placing a mixture obtained in a reaction kettle filled with a gas selected from the group consisting of nitrogen, argon, helium and carbon dioxide; sealing and placing in a muffle furnace; heating at 100-200° C. for 2-20 h and cooling to a room temperature to obtain the ternary oxide based composite cathode material, wherein a temperature can be increased at a rate of 2° C. min-.

In a detailed embodiment, the vapor deposition method comprises steps of: mixing sulfur and LiNi$_{0.8}$Co$_{0.15}$Al$_{0.05}$O$_2$ or LiNi$_x$Co$_y$Mn$_{1-x-y}$O$_2$ ($0<x<1$, $0<y<1$, $0<x+y<1$) in proportion and grinding, then placing a mixture obtained in a reaction kettle filled with a gas selected from the group consisting of nitrogen, argon, helium and carbon dioxide; heating the reaction kettle at 100-200° C. for 2-20 h, and then heating at 250-350° C. for 2-12 h and cooling to a room temperature to obtain the ternary oxide based composite cathode material, wherein a temperature can be increased at a rate of 2° C. min$^{-1}$.

In a detailed embodiment, the dissolution-crystallization method comprises steps of: dissolving sulfur in a solvent, wherein a concentration range of the sulfur in a solution obtained is 1-20 mg mL$^{-1}$; then adding LiNi$_{0.8}$Co$_{0.15}$Al$_{0.05}$O$_2$ or LiNi$_x$Co$_y$Mn$_{1-x-y}$O$_2$ ($0<x<1$, $0<y<1$, $0<x+y<1$) into the solution in proportion, and stirring to evaporate the solvent; drying and cooling a solid obtained to obtain the ternary oxide based composite cathode material; wherein the solvent is selected from the group consisting of carbon disulfide, carbon tetrachloride, benzene, toluene, o-xylene, m-xylene, p-xylene, cyclohexane, octane, tetrachloroethylene, trichlorethylene and tetrachloroethane.

In a detailed embodiment, the chemical deposition method comprises steps of: fully mixing LiNi$_{0.8}$Co$_{0.15}$Al$_{0.05}$O$_2$ or LiNi$_x$Co$_y$Mn$_{1-x-y}$O$_2$ ($0<x<1$, $0<y<1$, $0<x+y<1$) with a sulfide solution, and adding an acid solution drop by drop to obtain sulfur by reaction of the sulfide solution and the acid solution; centrifuging and drying to obtain the ternary oxide based composite cathode material; wherein the sulfide solution is sodium thiosulfate or sodium polysulfide solution with a concentration of 0.01-1 mol L$^{-1}$; the acid solution is selected from the group consisting of sulfuric acid, hydrochloric acid, nitric acid, phosphoric acid, acetic acid and formic acid with a concentration is 0.1-10 mol L$^{-1}$; a reaction time is 0.5-6 h.

Preferably, the sulfur is one or both of precipitated sulfur and sublimated sulfur, and a mesh number of sulfur powder is 100-325 meshes.

In another typical embodiment, the present invention also provides a lithium-sulfur battery, comprising a cathode plate made of the ternary oxide based composite cathode material as mentioned above. The cathode plate can be prepared by a smear method. For example, the composite cathode material, conductive carbon black and polyvinylidene fluoride (PVdF) can be added to N-methylpyrrolidone (NMP) and stirred to obtain cathode slurry; then the cathode slurry is coated on aluminum foil and dried in a drying box; finally, the cathode plate is cut into a round plate.

The technical solutions of the present invention will be further illustrated in the examples below. However, the examples and contrast example are used to explain the embodiments of the present invention and do not exceed the scope of the present invention. The protection scope of the present invention will not be limited by the examples. Unless otherwise specified, materials and reagents used in the present invention are commercially available in this field.

Examples 1-5 relate to a preparation method of an S/Li(Ni$_{0.8}$Co$_{0.15}$Al$_{0.05}$)O$_2$ composite cathode material and a lithium-sulfur battery prepared based on the composite cathode material.

Example 1

The Li(Ni$_{0.8}$Co$_{0.15}$Al$_{0.05}$)O$_2$ and the sulfur were fully mixed at a mass ratio of 30:70, and then kept at 155° C. for 12 h under an argon atmosphere to obtain an S/Li(Ni$_{0.8}$Co$_{0.15}$Al$_{0.05}$)O$_2$-1 composite cathode material.

Figure 2:
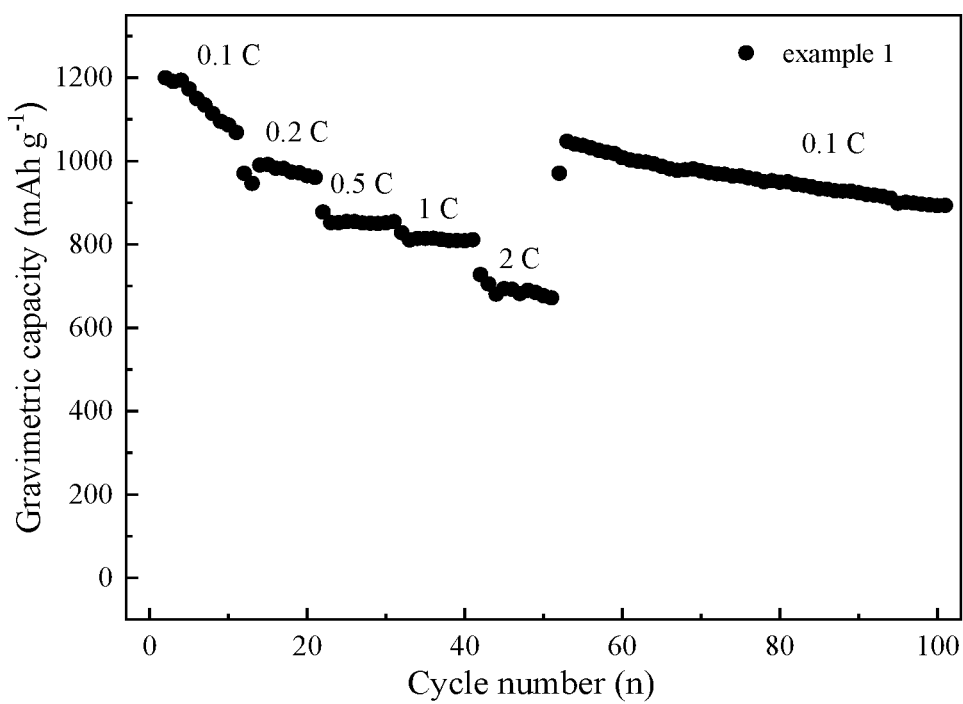
FIG. 2 is a graph showing cycle performance of the composite cathode material according to example 1 at stepped rates.

The prepared composite cathode material was made into an electrode plate according to the following method, and was assembled into a battery for testing:

weighing the S/Li(Ni$_{0.8}$Co$_{0.15}$Al$_{0.05}$)O$_2$-1 composite cathode material, Super P and PVdF according to a mass ratio of 70:20:10, and fully mixing; adding an appropriate amount of NMP, and stirring for 4 h to obtain cathode slurry with a suitable viscosity (Super P, PVdF and NMP are all conventional reagents in the field); then coating the slurry on aluminum foil, and drying in a 60° C. drying oven for 12 h; cutting a cathode plate obtained into a round plate with a diameter of 10 mm, and assembling into a button cell in a glove box filled with argon while using 10 μL electrolyte (per mg of sulfur); stabling for 4 h before testing the button cell on a battery test system by a charge and discharge program with a rate of 0.1 C rate and a voltage of 1.7-2.8 V; calculating a specific discharge capacity of the button cell based on a sulfur mass, wherein changes in discharge capacity with a number of cycles is shown in FIG. 1, and relevant data are shown in Table 1. In addition, a stepped rate charge and discharge test was also performed on the button cell, and lithium-sulfur battery stepped rate cycle of the S/Li(Ni$_{0.8}$Co$_{0.15}$Al$_{0.05}$)O$_2$-1 composite material is shown in FIG. 2.

Example 2

The Li(Ni$_{0.8}$Co$_{0.15}$Al$_{0.05}$)O$_2$ and the sulfur were fully mixed at a mass ratio of 30:70, and then kept at 155° C. for 8 h under an argon atmosphere before being heated to 300° C. to obtain an S/Li(Ni$_{0.8}$Co$_{0.15}$Al$_{0.05}$)O$_2$-2 composite cathode material.

The S/Li(Ni$_{0.8}$Co$_{0.15}$Al$_{0.05}$)O$_2$-2 composite cathode material was fabricated into an electrode according to the method in example 1, and assembled into a battery for testing. The electrolyte dosage was 10 μL (per mg of sulfur). A specific discharge capacity of the battery was calculated based on a sulfur mass. Electrochemical performance test of the battery was carried out according to the method in example 1, wherein changes in discharge capacity with a number of cycles is shown in FIG. 1, and relevant data are shown in Table 1.

Example 3

The Li(Ni$_{0.8}$Co$_{0.15}$Al$_{0.05}$)O$_2$ and the sulfur were fully mixed at a mass ratio of 30:70, and then ground for 15-60 min to obtain an S/Li(Ni$_{0.8}$Co$_{0.15}$Al$_{0.05}$)O$_2$-3 composite cathode material.

The S/Li(Ni$_{0.8}$Co$_{0.15}$Al$_{0.05}$)O$_2$-3 composite cathode material was fabricated into an electrode according to the method in example 1, and assembled into a battery for testing. The electrolyte dosage was 10 μL (per mg of sulfur). A specific discharge capacity of the battery was calculated based on a sulfur mass. Electrochemical performance test of the battery was carried out according to the method in example 1, wherein changes in discharge capacity with a number of cycles is shown in FIG. 1, and relevant data are shown in Table 1.

Example 4

The sulfur was dissolved in CS$_2$ at a ratio of 5 mg mL$^{-1}$ by stirring, and then the Li(Ni$_{0.8}$Co$_{0.15}$Al$_{0.05}$)O$_2$ was added with a mass ratio of 30:70 to sulfur, and stirred slowly at 60° C. to evaporate solvent; a solid obtained was dried in vacuum and cooled to obtain an S/Li(Ni$_{0.8}$Co$_{0.15}$Al$_{0.05}$)O$_2$-4 composite cathode material.

The S/Li(Ni$_{0.8}$Co$_{0.15}$Al$_{0.05}$)O$_2$-4 composite cathode material was fabricated into an electrode according to the method in example 1, and assembled into a battery for testing. The electrolyte dosage was 10 μL (per mg of sulfur). A specific discharge capacity of the battery was calculated based on a sulfur mass. Electrochemical performance test of the battery was carried out according to the method in example 1, wherein changes in discharge capacity with a number of cycles is shown in FIG. 1, and relevant data are shown in Table 1.

Example 5

0.03 mol sodium thiosulfate was dissolved in 200 mL water (containing 1 wt. % PVP), then 0.24 g Li(Ni$_{0.8}$Co$_{0.15}$Al$_{0.05}$)O$_2$ was added, and 30 mL dilute hydrochloric acid (5 wt. %) was added drop by drop; sodium thiosulfate reacted with hydrochloric acid to obtain the sulfur, which was then deposited on a surface of the Li(Ni$_{0.8}$Co$_{0.15}$Al$_{0.05}$)O$_2$; the solution was centrifuged, washed and dried to obtain an S/Li(Ni$_{0.8}$Co$_{0.15}$Al$_{0.05}$)O$_2$-5 composite cathode material.

The S/Li(Ni$_{0.8}$Co$_{0.15}$Al$_{0.05}$)O$_2$-5 composite cathode material was fabricated into an electrode according to the method in example 1, and assembled into a battery for testing. The electrolyte dosage was 10 μL (per mg of sulfur). A specific discharge capacity of the battery was calculated based on a sulfur mass. Electrochemical performance test of the battery was carried out according to the method in example 1, wherein changes in discharge capacity with a number of cycles is shown in FIG. 1, and relevant data are shown in Table 1.

Referring to a graph showing cycle performance of composite cathode materials according to examples 1-5 at 0.1C (FIG. 1), the S/Li(Ni$_{0.8}$Co$_{0.15}$Al$_{0.05}$)O$_2$ composite cathode materials prepared by the melting method, the vapor deposition method, the simple mixing method, the dissolution-crystallization method, and the chemical deposition method all have excellent cycle performance, which shows that the nickel-cobalt-aluminum ternary material as the host material of the sulfur cathode of lithium-sulfur batteries can effectively fix sulfur. This is mainly due to the nickel-cobalt-aluminum ternary material is a polar oxide, which can absorb polysulfide ions with the help of chemical bonding, inhibit the "shuttle effect", and improve the cycle stability of the battery. FIG. 2 is a graph showing cycle performance of the composite cathode material according to the example 1 at stepped rates, which shows that the rate performance of the S/Li(Ni$_{0.8}$Co$_{0.15}$Al$_{0.05}$)O$_2$ composite cathode material for lithium-sulfur batteries is superior. At the same time, due to the high tap density, the nickel-cobalt-aluminum ternary material can improve the tap density of the cathode material after being combined with the sulfur, thereby increasing the energy density of the battery. The battery still achieves sufficient cycle performance at a lower electrolyte dosage (10 μL), indicating that the small specific surface area of the nickel-cobalt-aluminum ternary material is beneficial to reduce the using of electrolyte and increase the energy density of the battery as a whole.

Examples 6-11 relate to a preparation method of a sulfur/LiNi$_x$Co$_y$Mn$_{1-x-y}$O$_2$ (0<x<1, 0<y<1, 0<x+y<1) composite cathode material and a lithium-sulfur battery prepared based on the composite cathode material.

Example 6

Figure 3:
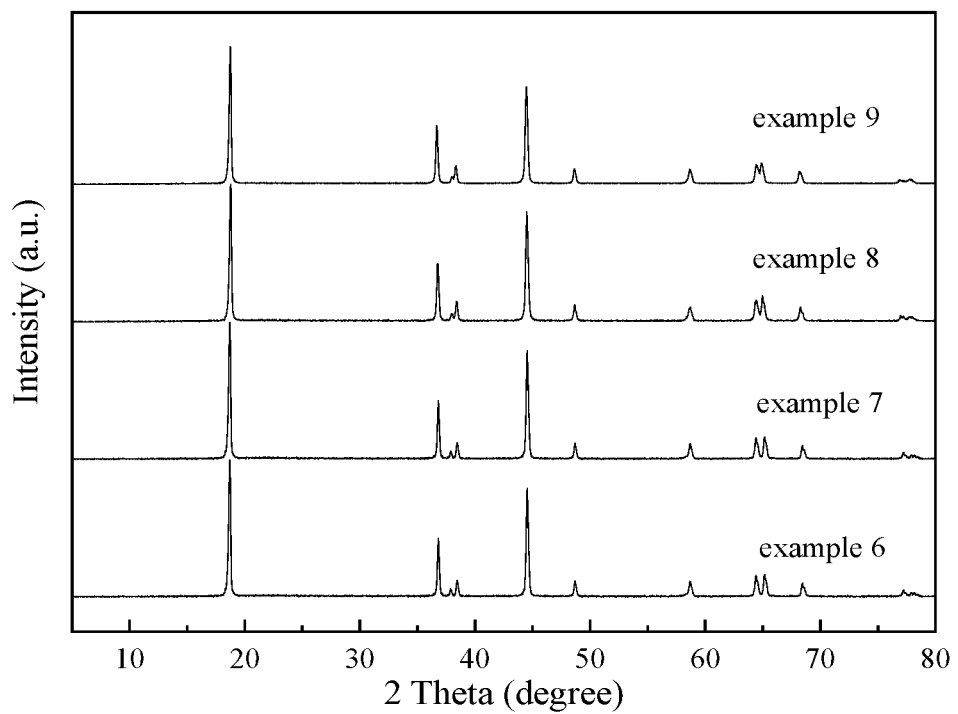
FIG. 3 is XRD patterns of the composite cathode materials according to examples 6-9.
Figure 4:
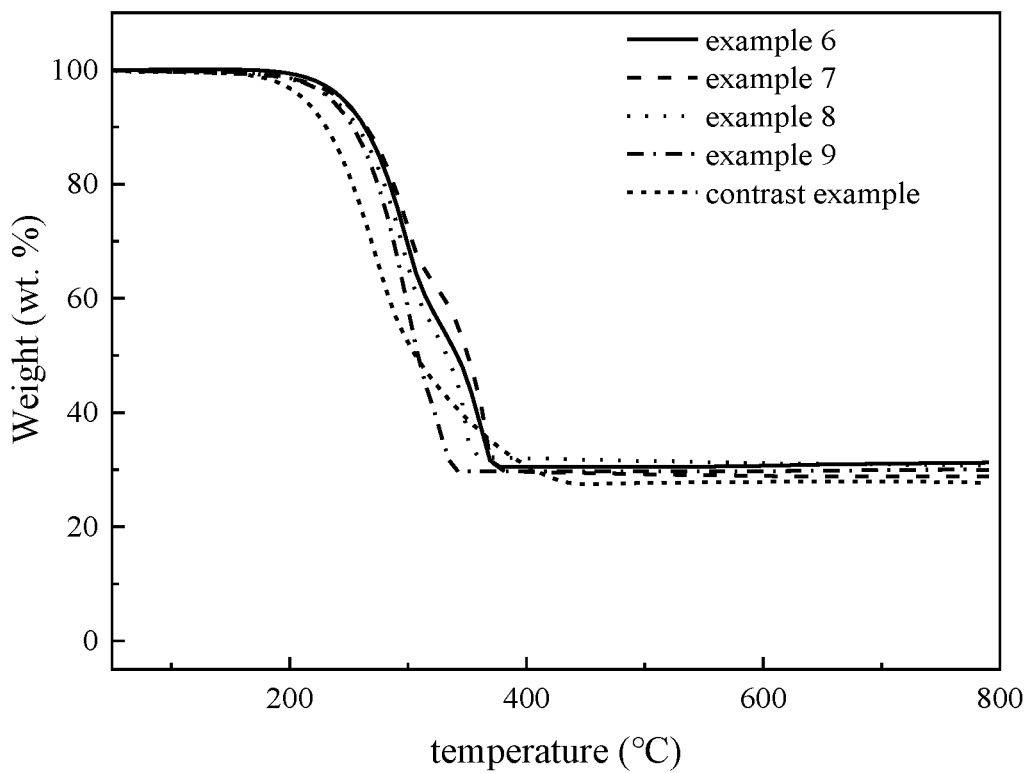
FIG. 4 is TG patterns of the composite cathode materials according to the examples 6-9 and a contrast example.

The nickel-cobalt-manganese ternary material used was a commercialized lithium-ion battery cathode material $LiNi_{1/3}Co_{1/3}Mn_{1/3}O_2$, in which a ratio of nickel, cobalt and manganese was 1:1:1. An XRD spectrum of the material is shown in FIG. 3. The $LiNi_{1/3}Co_{1/3}Mn_{1/3}O_2$ and the sulfur was mixed at a mass ratio of 30:70, then ground and transferred to a reactor. After sealing, the reactor was placed in a muffle furnace and heated to 155° C. at a rate of 2° C. $min^{-1}$, and the temperature was kept for 12 h before cooling to a room temperature to obtain an $S/LiNi_{1/3}Co_{1/3}Mn_{1/3}O_2$ composite cathode material for the lithium-sulfur battery. The sulfur content measured by TG was 69.67 wt. %, as shown in FIG. 4.

Figure 5:
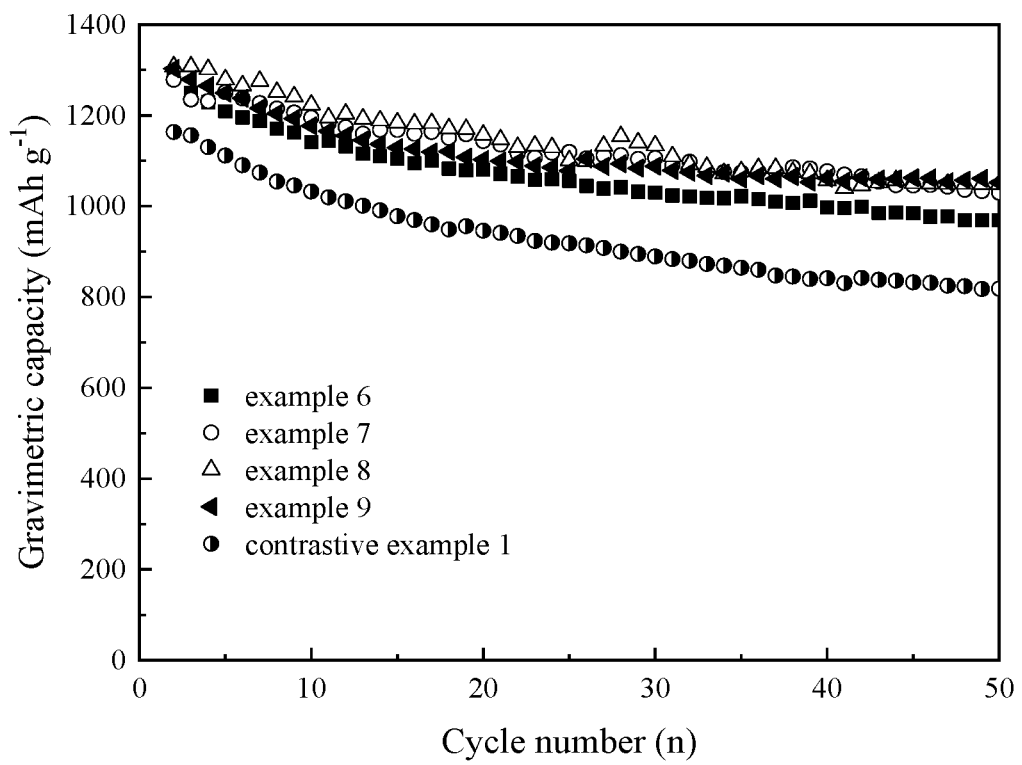
FIG. 5 is a discharge specific capacity diagram of lithium-sulfur batteries according to the examples 6-9 and the contrast example at 0.1C.

The prepared composite cathode material was made into an electrode plate according to the following process, and was assembled into a battery for testing:

(1) Preparing the Electrode Plate adding $S/LiNi_{1/3}Co_{1/3}Mn_{1/3}O_2$ composite cathode material, conductive carbon black and polyvinylidene fluoride (PVdF) to N-methylpyrrolidone (NMP) in a mass ratio of 70:20:10, and stirring for 4 h to obtain cathode slurry (both PVdF and NMP are conventional reagents in the field); then coating the slurry on aluminum foil, and drying in a 60° C. drying oven for 12 h; cutting the cathode plate into a round plate with a diameter of 10 mm;

(2) Assembling the Battery assembling the battery assembly in a glove box with argon atmosphere, wherein a button cell (type 2032) is assembled in an order of "negative case-shrapnel-gasket-lithium sheet-diaphragm-electrolyte-cathode plate-positive case"; a dosage of the electrolyte is 10 μL (per mg of sulfur), a diameter of the cathode plate is 10 mm, a diameter of the diaphragm is 16 mm, and a diameter of the lithium sheet is 14 mm; and (3) Testing Cycle Performance stabling the assembled battery for 6 h before performing a constant current charge and discharge test, wherein a voltage range is 1.7-2.8 V, a current density is set 0.1 C (1 C=1675 mA $g^{-1}$); calculating a specific discharge capacity of the button cell based on a sulfur mas to obtain a cycle performance curve of the button cell, as shown in FIG. 5. Specifically, the specific discharge capacity of the composite cathode material of the example 6 was 1255.0 mAh $g^{-1}$ in the first week, and the specific discharge capacity after 50 cycles was 1050.3 mAh $g^{-1}$; the capacity retention rate was 83.7%.

Example 7

The nickel-cobalt-manganese ternary material used was a commercialized lithium-ion battery cathode material $LiNi_{0.8}Co_{0.2}Mn_{0.3}O_2$, in which a ratio of nickel, cobalt and manganese was 5:2:3. An XRD spectrum of the material is shown in FIG. 3. The $LiNi_{0.8}Co_{0.2}Mn_{0.3}O_2$ and the sulfur was mixed at a mass ratio of 30:70, then ground and transferred to a reactor. After sealing, the reactor was placed in a muffle furnace and heated to 155° C. at a rate of 2° C. $min^{-1}$, and the temperature was kept for 12 h before cooling to a room temperature to obtain an $S/LiNi_{0.8}Co_{0.2}Mn_{0.3}O_2$ composite cathode material. The sulfur content measured by TG was 71.25 wt. %, as shown in FIG. 4.

The composite cathode material was fabricated into an electrode plate according to the method in example 6, and assembled into a battery for testing. A specific discharge capacity of the battery was calculated based on a sulfur mass. Specifically, the specific discharge capacity of the composite cathode material of the example 7 was 1308.1 mAh $g^{-1}$ in the first week, and the specific discharge capacity after 50 cycles was 968.5 mAh $g^{-1}$; the capacity retention rate was 74.0%.

Example 8

The nickel-cobalt-manganese ternary material used was a commercialized lithium-ion battery cathode material $LiNi_{0.6}Co_{0.2}Mn_{0.2}O_2$, in which a ratio of nickel, cobalt and manganese was 6:2:2. An XRD spectrum of the material is shown in FIG. 3. The $LiNi_{0.6}Co_{0.2}Mn_{0.2}O_2$ and the sulfur was mixed at a mass ratio of 30:70, then ground and transferred to a reactor. After sealing, the reactor was placed in a muffle furnace and heated to 155° C. at a rate of 2° C. $min^{-1}$, and the temperature was kept for 12 h before cooling to a room temperature to obtain an $S/LiNi_{0.6}Co_{0.2}Mn_{0.2}O_2$ composite cathode material. The sulfur content measured by TG was 69.01 wt. %, as shown in FIG. 4.

The composite cathode material was fabricated into an electrode plate according to the method in example 6, and assembled into a battery for testing. A specific discharge capacity of the battery was calculated based on a sulfur mass. Specifically, the specific discharge capacity of the composite cathode material of the example 8 was 1037.4 mAh $g^{-1}$ in the first week, and the specific discharge capacity after 50 cycles was 1048.1 mAh $g^{-1}$; the capacity retention rate was 80.2%.

Example 9

The nickel-cobalt-manganese ternary material used was a commercialized lithium-ion battery cathode material $LiNi_{0.8}Co_{0.1}Mn_{0.1}O_2$, in which a ratio of nickel, cobalt and manganese was 8:1:1. An XRD spectrum of the material is shown in FIG. 3. The $LiNi_{0.8}Co_{0.1}Mn_{0.1}O_2$ and the sulfur was mixed at a mass ratio of 30:70, then ground and transferred to a reactor. After sealing, the reactor was placed in a muffle furnace and heated to 155° C. at a rate of 2° C. $min^{-1}$, and the temperature was kept for 12 h before cooling to a room temperature to obtain an $S/LiNi_{0.8}Co_{0.1}Mn_{0.1}O_2$ composite cathode material. The sulfur content measured by TG was 69.01 wt. %, as shown in FIG. 4. A tag density of the composite cathode material was 1.81 g $cm^{-3}$.

The composite cathode material of the example 9 was fabricated into an electrode plate according to the method in example 6, and assembled into a battery for testing. A specific discharge capacity of the battery was calculated based on a sulfur mass. Specifically, the specific discharge capacity of the composite cathode material of the example 9 was 1302.9 mAh $g^{-1}$ in the first week, and the specific discharge capacity after 50 cycles was 1052.0 mAh $g^{-1}$; the capacity retention rate was 81.4%.

Example 10

Different from the example 6, the $LiNi_{1/3}Co_{1/3}Mn_{1/3}O_2$ was mixed with the sulfur at a mass ratio of 50:50 to obtain an $S/LiNi_{1/3}Co_{1/3}Mn_{1/3}O_2$-2 composite cathode material. An electrode plate was fabricated, and a battery was assembly and tested according to the method of the example 6. A specific discharge capacity of the composite cathode material of the example 10 was 1268.9 mAh $g^{-1}$ in the first week, and the specific discharge capacity after 50 cycles was 922.6 mAh g$^{-1}$; the capacity retention rate was 72.7%.

Example 11

Different from the example 8, the LiNi$_{0.6}$Co$_{0.2}$Mn$_{0.2}$O$_2$ was mixed with the sulfur at a mass ratio of 20:80 to obtain an S/LiNi$_{0.6}$Co$_{0.2}$Mn$_{0.2}$O$_2$-2 composite cathode material. An electrode plate was fabricated, and a battery was assembly and tested according to the method of the example 8. A specific discharge capacity of the composite cathode material of the example 11 was 1174.8 mAh g$^{-1}$ in the first week, and the specific discharge capacity after 50 cycles was 919.7 mAh g$^{-1}$; the capacity retention rate was 78.3%.

Contrast Example 1

For comparison, the present invention provides an S/bp2000 composite cathode material for the lithium-sulfur battery. The bp2000 is a common commercial conductive carbon. Specific preparation is as follows.

The bp2000 and the sulfur was mixed at a mass ratio of 30:70, then ground and transferred to a reactor. After sealing, the reactor was placed in a muffle furnace and heated to 155° C. at a rate of 2° C. min$^{-1}$, and the temperature was kept for 12 h before cooling to a room temperature to obtain the S/bp2000 composite cathode material. The sulfur content measured by TG was 72.3 wt. %, as shown in FIG. 4.

The composite cathode material of the contrast example 1 was fabricated into an electrode plate according to the method in example 6, and assembled into a battery for testing. A specific discharge capacity of the battery was calculated based on a sulfur mass. Specifically, the specific discharge capacity of the composite cathode material of the contrast example 1 was 1163.3 mAh g$^{-1}$ in the first week, and the specific discharge capacity after 50 cycles was 818.3 mAh g$^{-1}$; the capacity retention rate was 70.3%.

TABLE 1

Comparison of battery cycle performance of examples 1-9

| No. | specific discharge capacity in the first cycle (mAh g$^{-1}$) | specific discharge capacity after 50 cycles (mAh g$^{-1}$) | capacity retention rate after 50 cycles |
|---|---|---|---|
| example1 | 1206.9 | 769.3 | 63.7% |
| example2 | 1217.0 | 841.0 | 69.1% |
| example3 | 1220.2 | 722.3 | 59.2% |
| example4 | 1365.1 | 919.3 | 67.3% |
| example5 | 1359.6 | 948.1 | 69.7% |
| example6 | 1255.0 | 1050.3 | 83.7% |
| example7 | 1308.1 | 968.5 | 74.0% |

TABLE 1-continued

Comparison of battery cycle performance of examples 1-9

| No. | specific discharge capacity in the first cycle (mAh g$^{-1}$) | specific discharge capacity after 50 cycles (mAh g$^{-1}$) | capacity retention rate after 50 cycles |
|---|---|---|---|
| example8 | 1307.4 | 1048.1 | 80.2% |
| example9 | 1302.9 | 1052.0 | 81.4% |
| example10 | 1268.9 | 922.6 | 72.7% |
| example11 | 1174.8 | 919.7 | 78.3% |
| contrast example 1 | 1163.3 | 818.3 | 70.3% |

Figure 6:
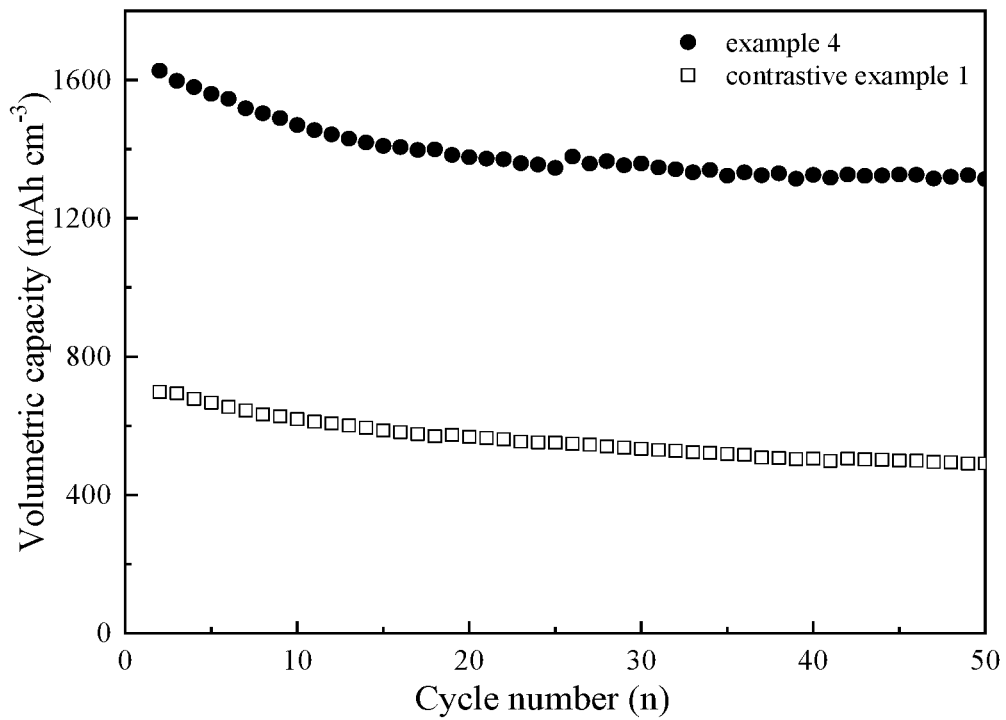
FIG. 6 is a graph showing volumetric capacities of the composite cathode materials according to the example 4 and the contrast example at 0.1C.

It can be seen from Table 1 and FIG. 5 that the sulfur/LiNi$_x$Co$_y$Mn$_{1-x-y}$O$_2$ (0<x<1, 0<y<1, 0<x+y<1) ternary material composite cathode material provided by the present invention, which is prepared by hosting the sulfur on the LiNi$_x$Co$_y$Mn$_{1-x-y}$O$_2$ (0<x<1, 0<y<1, 0<x+y<1) ternary material, exhibits sufficient capacity retention rate which is much higher than that of based on commercial conductive carbon bp2000. This shows that the LiNi$_x$Co$_y$Mn$_{1-x-y}$O$_2$ (0<x<1, 0<y<1, 0<x+y<1) ternary material has a strong chemisorption effect on lithium polysulfide and can inhibit the shuttle effect, thereby obtaining the composite cathode material with high capacity and high cycle stability. It can be seen from FIG. 6 that due to the high tap density of the LiNi$_x$Co$_y$Mn$_{1-x-y}$O$_2$ (0<x<1, 0<y<1, 0<x+y<1) ternary material, the volumetric capacity density of the sulfur cathode composite material as the host material is much higher than that of the sulfur-carbon composite material. At the same time, the LiNi$_x$Co$_y$Mn$_{1-x-y}$O$_2$ (0<x<1, 0<y<1, 0<x+y<1) ternary material has small specific surface area, which can reduce the amount of electrolyte and increase the overall energy density of the battery. Obviously, the preferred embodiments of the present invention should not limit the present invention, and the claims of the present invention should be interpreted as including the preferred embodiments and all changes and modifications that fall within the scope of the present invention.

What is claimed is:

1. A ternary oxide based composite cathode material, for a lithium-sulfur battery, comprising: sulfur and LiNi$_{0.8}$Co$_{0.15}$Al$_{0.05}$O$_2$ or LiNi$_x$Co$_y$Mn$_{1-x-y}$O$_2$ (0<x<1, 0<y<1, 0<x+y<1) as a host, wherein a sulfur content is 50 wt. %-80 wt. %;

wherein the LiNi$_x$Co$_y$Mn$_{1-x-y}$O$_2$ has a layered structure, which is a secondary particle formed by accumulating primary particles; the secondary particles are spherical with a diameter of 2-25 μm; the LiNi$_x$Co$_y$Mn$_{1-x-y}$O$_2$ has a specific surface area of 10.0-100 m$^2$ g$^{-1}$, and a tap density of 2.0-2.6 g cm$^{-3}$.

* * * * *